United States Patent
Arora (10) Patent No.: US 9,846,471 B1
(45) Date of Patent: Dec. 19, 2017

(54) SYSTEMS AND METHODS FOR POWER MANAGEMENT IN DEVICES

(71) Applicant: Marvell International Ltd., Hamilton (BM)

(72) Inventor: Gaurav Arora, Cupertino, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 42 days.

(21) Appl. No.: 15/001,937

(22) Filed: Jan. 20, 2016

Related U.S. Application Data (60) Provisional application No. 62/115,380, filed on Feb. 12, 2015.

(51) Int. Cl.
*G06F 1/32* (2006.01)

(52) U.S. Cl.
CPC .......... *G06F 1/3206* (2013.01); *G06F 1/3209* (2013.01); *G06F 1/3231* (2013.01)

(58) Field of Classification Search
CPC ..... G06F 1/3206; G06F 1/3209; G06F 1/3231
See application file for complete search history.

(56) References Cited

U.S. PATENT DOCUMENTS

| | | | | |
|---|---|---|---|---|
| 8,806,530 B1 * | 8/2014 | Izdepski | ............... | H04N 21/258 725/141 |
| 9,189,049 B2 * | 11/2015 | Kumar | .................. | G06F 1/3203 |
| 2007/0234084 A1 * | 10/2007 | Furuta | .................. | G06F 1/3228 713/300 |
| 2012/0226756 A1 * | 9/2012 | Lindquist | ............. | G06F 1/3203 709/204 |
| 2015/0128203 A1 * | 5/2015 | Hoang | ................. | H04H 20/426 725/153 |

\* cited by examiner

*Primary Examiner* — Stefan Stoynov

(57) ABSTRACT

Systems and methods for conserving power in an apparatus are provided. A sensor of the apparatus is configured to detect an event comprising a device having a predetermined attribute entering into a designated region surrounding the apparatus. An integrated circuit (IC) of the apparatus operable in multiple power modes. The IC is configured to transition from a low-power standby mode to a high-power standby mode upon detection of the event by the sensor. The IC is further configured to transition from either the low-power standby mode or the high-power standby mode to an active mode upon occurrence of one of multiple wakeup events. The transition from the high-power standby mode to the active mode takes less time than the transition from the low-power standby mode to the active mode.

14 Claims, 4 Drawing Sheets

| Mode | Power Consumption | Time to Transition from Standby to Active Mode | Characteristics |
|---|---|---|---|
| Passive Standby | Nominal (*e.g.*, 1 watt) | Longer (*e.g.*, 20-30 seconds) | Monitors for occurrence of wakeup event; no system software running, no OS running. |
| Active Standby | Higher (*e.g.*, 1.5-2 watts) | Shorter (*e.g.*, 1-2 seconds) | Monitors for occurrence of wakeup event; system software and OS running. |
| Active | Highest (*e.g.*, 6-10 watts) | n/a | Software running and audio/video systems on. |

FIG. 3

FIG. 4

SYSTEMS AND METHODS FOR POWER MANAGEMENT IN DEVICES

CROSS-REFERENCE TO RELATED APPLICATIONS

This disclosure claims priority to U.S. Provisional Patent Application No. 62/115,380, filed on Feb. 12, 2015, which is incorporated herein by reference in its entirety.

TECHNICAL FIELD

The technology described in this document relates generally to power management in devices and more particularly to systems and methods for automatic switching of standby power states in a television/set-top box.

BACKGROUND

A set-top box (STB) is a device whose primary function is to receive television signals from a source (e.g., cable, satellite) and deliver the signals to a display, such as a television. When operating in an active mode (e.g., when the STB is actively being used to receive and process signals and provide the processed signals to the television), the STB consumes a significant amount of power. To conserve power when not being actively used, the STB is configured to operate in a standby mode. When operating in the standby mode, the STB is essentially switched off but is able to monitor for wakeup events, such as the receipt of an infrared signal emitted by a remote control. The occurrence of a wakeup event causes the STB to transition from the standby mode to the active mode. The standby mode enables power to be conserved without having to disconnect the STB from its power supply.

SUMMARY

The present disclosure is directed to systems and methods for power management in devices. An example apparatus includes a sensor configured to detect an event a device having a predetermined attribute entering into a designated region surrounding the apparatus. The apparatus further includes an integrated circuit (IC) operable in multiple power modes. The IC is configured to transition from a low-power standby mode to a high-power standby mode upon detection of the event by the sensor. The IC consumes a higher amount of power in the high-power standby mode as compared to the low-power standby mode. The IC is further configured to transition from either the low-power standby mode or the high-power standby mode to an active mode upon occurrence of one of multiple wakeup events. The transition from the high-power standby mode to the active mode takes less time than the transition from the low-power standby mode to the active mode.

In another example, a set-top box (STB) includes a sensor configured to detect an event comprising a device having a predetermined attribute entering into a designated region surrounding the apparatus. The STB further includes a system-on-chip (SOC) operable in multiple power modes. The STB is configured to transition from a low-power standby mode to a high-power standby mode upon detection of the event by the sensor. The SOC consumes a higher amount of power in the high-power standby mode as compared to the low-power standby mode. The SOC is further configured to transition from either the low-power standby mode or the high-power standby mode to an active mode upon occurrence of one of multiple wakeup events. The transition from the high-power standby mode to the active mode takes less time than the transition from the low-power standby mode to the active mode.

In an example method for conserving power in an apparatus, a first event comprising a device having a predetermined attribute entering into a designated region surrounding the apparatus is detected with a sensor. An IC of the apparatus transitions from a low-power standby mode to a high-power standby mode upon detection of the first event by the sensor. The IC consumes a higher amount of power in the high-power standby mode as compared to the low-power standby mode. A second event comprising the device exiting the designated region is detected with the sensor. The IC of the apparatus transitions from the high-power standby mode to the low-power standby mode upon detection of the second event by the sensor. The IC is further configured to transition from either the low-power standby mode or the high-power standby mode to an active mode upon occurrence of one of multiple wakeup events, where the transition from the high-power standby mode to the active mode takes less time than the transition from the low-power standby mode to the active mode.

DETAILED DESCRIPTION

Figure 1:
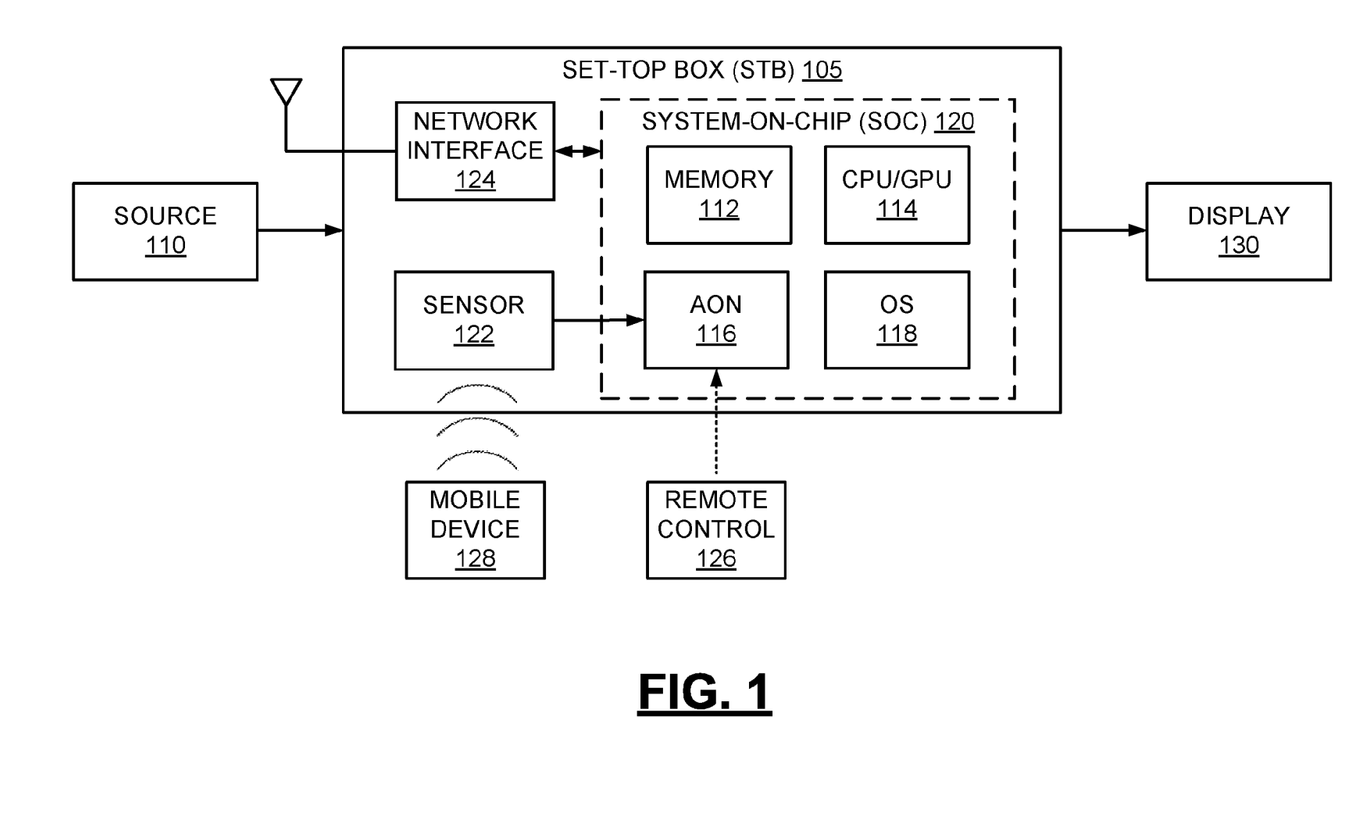
FIG. 1 is a diagram depicting a set-top box, in accordance with an embodiment of the disclosure.

FIG. 1 is a diagram depicting a set-top box (STB) 105, in accordance with an embodiment of the disclosure. As shown in the figure, the STB 105 includes a system-on-chip (SOC) 120, which generally includes hardware, firmware, and/or software needed to run the STB 105. SOCs are known to those of ordinary skill in the art, and an SOC generally comprises an integrated circuit that integrates various components of a computer or electronic system into a single chip (e.g., on a single chip substrate). Thus, in some embodiments, the components shown in box 120 are formed on a single chip. In other embodiments, however, the components shown in box 120 are implemented in multiple chips. In the example of FIG. 1, the SOC 120 includes one or more processors 114. The one or more processors 114 include a central processing unit (CPU) and/or a graphics processing unit (GPU) (e.g., video processor), for example. Processors of the one or more processors 114 are implemented via a microcontroller, digital signal processor, or another processor type, for example. The SOC 120 also includes a memory 112 comprising one or more of random access memory (RAM), nonvolatile memory (e.g., flash memory), read only memory (ROM), and other suitable electronic data storage, or any combination thereof. The SOC 120 further includes various firmware and/or software, such as an operating system 118, comprising computer-executable instructions stored in the memory 112 and executed by one or more of the processors 114. It is noted that the SOC 120 depicted in FIG. 1 and described herein is only an example, and that the SOC 120 may include various other components in other examples.

In one embodiment, the STB 105, for example, the SOC 120, is configured to operate in multiple power modes. The multiple power modes include an active mode, a high-power standby mode (e.g., an active standby mode), and a low-power standby mode (e.g., a passive standby mode), for example. As described herein, the use of the multiple power modes by the SOC 120 enables energy to be conserved by the STB 105, while also optimizing one or more performance metrics of the STB 105. The SOC 120 is configured to switch between the different power modes automatically and without human intervention (or with only minimal human intervention). In examples, the automatic switching between the different power modes enables the STB 105 to wakeup quickly in certain conditions (e.g., conditions where quick wakeup is desirable) and to consume a relatively low amount of power during times when quick wakeup is not needed. This is described in detail below.

As illustrated in FIG. 1, STB 105 receives signals from a source 110 (e.g., antenna, cable, satellite, etc.) and outputs audio/video signals suitable for a display 130 such as a television, monitor, or other video or audio output device. In examples, the STB 105 also supports connections with a network (e.g., a local area network or a wireless local area network, etc.) via a network interface 124. The STB 105 includes various other components, in examples. Such components include tuners (e.g., for tuning into a channel in a broadband signal), amplifiers, analog-to-digital converters, demodulators, decoders, encoders, digital-to-analog converters, and other components, or any combination thereof.

When operating in an active mode (e.g., when the STB 105 is actively being used to receive and process signals and provide the processed signals to the display 130), the STB 105 and SOC 120 included therein consume a relatively large amount of power. To conserve power when not being actively used, the STB 105 and SOC 120 are configured to operate in multiple standby modes. In a "low-power standby mode" (e.g., a passive standby mode), most of the SOC 120 is powered down, except for always-on (AON) circuitry 116. In examples, the AON circuitry 116 comprises a relatively small portion of the entire SOC 120 (e.g., the AON circuitry 116 comprises a small number of gates, in comparison to a total number of gates included on the entire SOC 120) that is configured to monitor for occurrences of wakeup events. Wakeup events are events that cause the STB 105 and SOC 120 to transition from a standby mode to the active mode. In an example, the AON 116 is coupled to an infrared receiver that receives infrared signals from a wireless remote control 126. The pressing of a "power" key on the remote control 126 and the receipt of a corresponding infrared signal at the infrared receiver is an example of a wakeup event. Other wakeup events include a receipt of data packets at the STB 105 (e.g., LAN or WLAN data packets, etc.) and a receipt of a Bluetooth signal at the STB 105, among others.

As noted above, the AON 116 monitors for the occurrence of wakeup events. When a wakeup event occurs and is detected by the AON 116, the AON 116 causes the STB 105 and SOC 120 to transition to the active mode. To accomplish this transition, the AON 116 signals for other components of the SOC 120 to be powered up and to begin operation, in examples. In transitioning from the low-power standby mode to the active mode, system software and/or operating system (OS) software is initialized in the SOC 120, in examples. The transition from the low-power standby mode to the active mode is relatively time consuming. If dynamic random-access memory (DRAM) of the SOC 120 is in a self-refresh mode, the transition from the low-power standby mode to the active mode takes 5-7 seconds, in an example. If the DRAM is powered off and not in the self-refresh mode, the transition takes 20-30 seconds, in an example.

Recently, protocols have been developed to facilitate wireless streaming of audio and/or video data to the STB 105. These protocols call for the STB 105 to wakeup and begin playing audio and/or video from a source in a relatively small amount of time (e.g., 2 seconds or less). Google Cast and Apple AirPlay, among others, are examples of these types of protocols and are known to those of ordinary skill in the art. In the example of FIG. 1, a mobile device 128 is configured to use the Google Cast or Apple AirPlay protocol and is thus configured to generate and transmit messages in accordance with the respective protocol. The receipt of such a Google Cast or Apple AirPlay message at the STB 105 may comprise a wakeup event that causes the STB 105 and SOC 120 to transition from a standby mode to an active mode. As noted above, the transition from the low-power standby mode to the active mode takes approximately 5~30 seconds in examples, such that the fast wakeup required by these protocols is not possible.

A second standby mode, herein referred to as the "high-power standby mode" (e.g., an active standby mode), is used to achieve a faster wakeup time that can satisfy the fast wakeup required by the Google Cast and Apple AirPlay protocols. As noted above, in the low-power standby mode, most of the SOC 120 is powered down, except for the AON circuitry 116. In contrast, in the high-power standby mode, the SOC 120 and/or other portions of the STB 105 are powered up and running, but the display 130 is turned off, in examples. In the high-power standby mode, for example, system software and OS software are running in the SOC 120. The high-power standby mode consumes more power than the low-power standby mode, but the use of the high-power standby mode enables the STB 105 to transition to the active mode in a relatively small amount of time. Thus, when a wakeup event occurs, such as a receipt of a Google Cast or Apple AirPlay message at the STB 105, the transition from the high-power standby mode to the active mode is achieved in approximately 1-2 seconds, in an example. This relatively fast transition to the active mode satisfies the fast wakeup required by the Google Cast and Apple AirPlay protocols.

In an example STB, a user is able to set a default standby mode to the high-power standby mode or the low-power standby mode. Thus, for example, if the user is not interested in using the Google Cast and Apple AirPlay protocols, the user is able to set the default standby mode to the low-power standby mode. In this mode, the STB consumes a relatively small amount of power but takes a relatively long time to wakeup. In contrast, for example, if the user is interested in using Google Cast or Apple AirPlay, the user is able to set the default standby mode to the high-power standby mode. In this mode, the STB wakes up relatively quickly but consumes a higher amount of power as compared to the low-power standby mode.

In the latter scenario, where the high-power standby mode is selected as the default standby mode, energy is wasted. For example, when the user is away from the STB (e.g., when the user is at work, on vacation, etc.), the STB is idle and cannot be switched on by the user. Nevertheless, the STB continues to consume the higher amount of power of the high-power standby mode. In this example, it is possible for the user to manually control the default standby mode in a way that conserves power. For example, the user can manually switch to the low-power standby mode when he leaves for work and manually switch to the high-power standby mode when he returns home. Requiring the user to manually switch between the standby modes in this manner is undesirable (e.g., the user may forget to do so, may be unwilling to do so, etc.).

In contrast to the example STB described above, the STB 105 of FIG. 1 is configured to switch between the high-power standby mode or the low-power standby mode automatically and without manual, human intervention (or requiring only minimal human intervention). To achieve the automatic switching between the high-power standby mode or the low-power standby mode, the STB 105 of FIG. 1 includes a sensor 122 coupled to the SOC 120. If the sensor 122 detects that the mobile device 128 (which is capable of using Google Cast or Apple AirPlay) is in close proximity to the STB 105, then the sensor 122 provides an indication (e.g., a signal, message, data, etc.) to the SOC 120 that causes the SOC 120 to transition from the low-power standby mode to the high-power standby mode. As shown in FIG. 1, the indication is provided to the AON circuitry 116, in examples, and the AON circuitry 116 causes the aforementioned transitioning. Thus, when the mobile device 128 is in close proximity to the STB 105, the SOC 120 automatically enters the high-power standby mode and is then able to wakeup quickly (e.g., upon receipt of a Google Cast or Apple AirPlay message from the device 128).

If the sensor 122 detects that the mobile device 128 is no longer in close proximity to the STB 105, then the sensor 122 provides an indication to the SOC 120 that causes the SOC 120 to transition from the high-power standby mode to the low-power standby mode. Thus, when the mobile device 128 is no longer in close proximity to the STB 105, the SOC 120 automatically enters the low-power standby mode and is then able to conserve energy.

The sensor 122 determines that the mobile device 128 is in proximity to the STB 105 using one or more techniques. In an example, the sensor 122 is configured to detect a wireless signal that is transmitted by the mobile device 128. The mobile device 128 is configured to transmit a Bluetooth signal (e.g., a Bluetooth Low Energy (BLE) signal), in an example, and the sensor 122 is configured to determine that the mobile device 128 is in close proximity to the STB 105 based on the sensor's receipt of the Bluetooth signal. In another example, the sensor 122 is able to detect the presence of the mobile device 128 based on the mobile device 128 having a Wi-Fi functionality enabled (e.g., such that the mobile device 128 is scanning for Wi-Fi networks). The sensor 122 detects the presence of the mobile device 128 in various other ways, in examples.

It is noted that the sensor 122 is configured to detect the presence of the device 128 during times when the STB 105 is operating in the low-power standby mode and during times when the STB 105 is operating in the high-power standby mode. For example, when the STB 105 is operating in the low-power standby mode, the sensor 122 is configured to detect that the mobile device 128 has moved into a designated region surrounding the STB 105. Upon detection of this event by the sensor 122, the SOC 120 is configured to transition from the low-power standby mode to the high-power standby mode, as described above. In contrast, when the STB 105 is operating in the high-power standby mode, the sensor 122 is configured to detect that the mobile device 128 has moved out of the designated region surrounding the STB 105. Upon detection of this event by the sensor 122, the SOC 120 is configured to transition from the high-power standby mode to the low-power standby mode, as described above.

Although the embodiment of FIG. 1 relates to a set-top box/television, the method of conserving power described herein can be utilized in other devices, systems, and apparatuses, in other examples. Additionally, although the device that is detected by the sensor 122 is described above as being a "mobile device," the sensor 122 can detect other types of devices, systems, components, and/or objects, in examples. In the example of FIG. 1, the mobile device 128 is a smartphone, tablet computer, laptop computer, or other device. As noted above, the mobile device 128 is capable of using Google Cast or Apple Airplay, in examples. Throughout the description, references are made to Google Cast and Apple AirPlay. It should be noted that the mechanisms described herein are not so limited. For example, the power mode switching mechanisms described herein apply equally to any protocol that requires a STB to power on relatively quickly.

Figure 2:
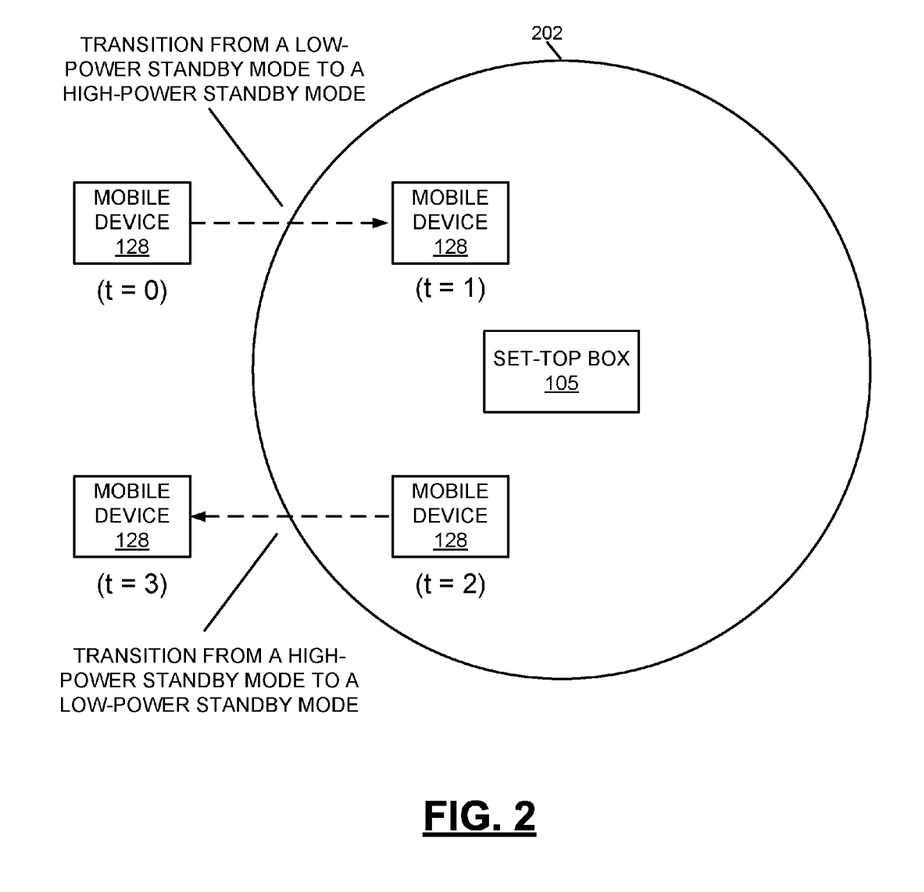
FIG. 2 is a diagram depicting a designated region surrounding a set-top box and a movement of a device into and out of the designated region.

To further illustrate the automatic switching between the different standby power modes, reference is made to FIG. 2. As described above, the STB 105 includes the sensor 122 configured to detect when particular types of devices (e.g., devices capable of using Google Cast or Apple AirPlay) are in close proximity to the STB 105. In an example, the sensor 122 is specifically configured to detect a first event that includes a device having a predetermined attribute entering into a designated region 202 surrounding the STB 105. In an example, the predetermined attribute is ability of the device to generate and transmit a message formatted in accordance with a protocol (e.g., the Google Cast or Apple AirPlay protocol) that facilitates wireless streaming of audio and video data to the STB 105. In another example, the predetermined attribute is an ability of the device to generate a wireless signal (e.g., a Bluetooth signal) that is detectable by the sensor 122. In other examples, the predetermined attribute is a Wi-Fi functionality of the device, an ability of the device to cause a wakeup event to occur, or another attribute.

The designated region 202 generally comprises an area that is in relative close proximity to the STB 105. In some examples, the designated region 202 is a defined geographical region (e.g., an area defined by a circle of a specified radius around the STB 105, an area defined by fixed geographical coordinates, etc.). In some examples, the designated region 202 is determined based on a range of the sensor 122. In these examples, the sensor 122 is configured to detect when the device having the predetermined attribute enters into the sensor's range (e.g., when the device can be detected by the sensor 122). In other examples, the sensor 122 determines that the device has entered into the designated region 202 based on a strength of a signal received from the device (e.g., if a signal received from the device is relatively strong or above a threshold level, it is determined that the device has entered the designated region 202). Various other methods can be used for determining when the device has entered into the designated region 202.

FIG. 2 depicts an example first event that includes the entry of the mobile device 128 into the designated region 202 surrounding the STB 105. As shown in the figure, at a first time (t=0), the mobile device 128 is outside of the designated region 202. The mobile device 128 subsequently enters the designated region 202, such that at a second time (t=1), the device 128 is shown as being inside the designated region 202. The mobile device 128 has a predetermined attribute (e.g., the mobile device 128 is capable of using Google Cast or Apple AirPlay), as described above, and thus, the sensor detects this entry of the mobile device 128 into the designated region 202 as a first event. Upon detection of the first event by the sensor 122, the SOC 120 is configured to transition from the low-power standby mode to the high-power standby mode. As described above, the SOC 120 consumes a higher amount of power in the high-power standby mode as compared to the low-power standby mode, but a transition from the high-power standby mode to the active mode (e.g., upon occurrence of a wakeup event) takes less time than a transition from the low-power standby mode to the active mode.

As described above, the sensor 122 of the STB 105 is further configured to detect when particular types of devices (e.g., devices capable of using Google Cast or Apple AirPlay) are no longer in close proximity to the STB 105. In an example, the sensor 122 is specifically configured to detect a second event that includes an exit of the device having the predetermined attribute from the designated region 202 surrounding the STB 105. FIG. 2 depicts an example second event involving the mobile device 128. As shown in the figure, at a third time (t=2), the mobile device 128 is inside of the designated region 202. The mobile device 128 subsequently exits the designated region 202, such that at a fourth time (t=3), the device 128 is shown as being outside of the designated region 202. As noted above, the mobile device 128 has the predetermined attribute (e.g., it is capable of generating and transmitting Google Cast or Apple AirPlay messages), and thus, the sensor detects this exit of the mobile device 128 from the designated region 202 as a second event. Upon detection of the second event by the sensor 122, the SOC 120 is configured to transition from the high-power standby mode to the low-power standby mode. The SOC 120 consumes a lower amount of power in the low-power standby mode as compared to the high-power standby mode, but a transition from the low-power standby mode to the active mode takes more time than a transition from the high-power standby mode to the active mode.

In embodiments disclosed herein, the SOC 120 is described as transitioning from the low-power standby mode to the high-power standby mode, and vice versa. In these embodiments and others, the STB 105 (as a whole) may be characterized as automatically transitioning between these power modes. It is thus noted that the STB 105 is configured to operate in multiple power modes and that the STB 105 is configured to automatically switch between these power modes based on the detection of the first and second events by the sensor 122. Further, in examples, the STB 105 or components of the STB 105 are integrated into a television, monitor, or other video or audio output device. In these examples, the television, monitor, or other video or audio output device is configured to automatically switch between the above-described power modes based on the detection of the first and second events by the sensor 122.

Figure 3:
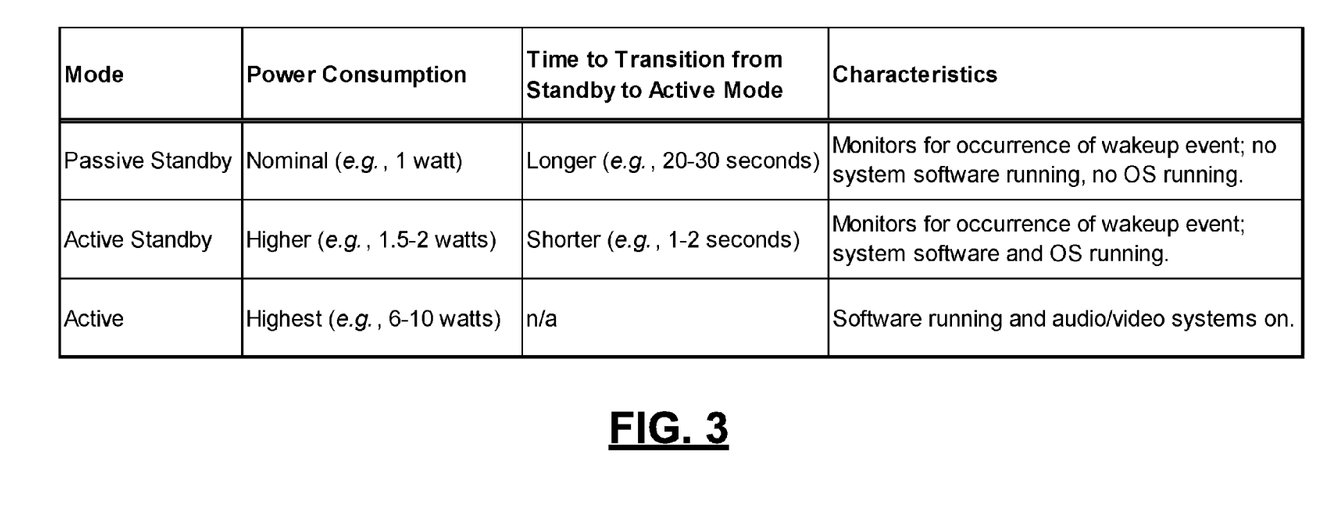
FIG. 3 is a table listing example characteristics of different power modes that may be utilized by a set-top box described herein.

FIG. 3 is a table listing example characteristics of the different power modes that are utilized by the STBs or SOCs described herein. As described above, these power modes include a passive standby mode, an active standby mode, and an active mode. The passive standby mode (also referred to herein as the "low-power standby mode") has a lowest power consumption (e.g., on the order of 1 watt, in an example) and takes a relatively long amount of time (e.g., 20-30 seconds) to transition to the active mode. In the passive standby mode, the STB or SOC included therein is configured to monitor for occurrence of wakeup events (e.g., a receipt of a particular infrared signal from a remote control, a receipt of LAN/WLAN data packets, a receipt of a Bluetooth signal, a receipt of a Google Cast or Apple AirPlay message, etc.). In the passive standby mode, system software and/or OS software are not running. In examples, the need to initialize such software upon wakeup is one of the reasons for the relatively long amount of time used in transitioning to the active mode.

The active standby mode (also referred to herein as the "high-power standby mode") has a higher power consumption (e.g., on the order of 1.5-2 watts, in an example) and takes a relatively short amount of time (e.g., 1-2 seconds) to transition to the active mode. In the active standby mode, the STB or SOC included therein is configured to monitor for occurrence of wakeup events, similar to the passive standby mode. Additionally, in the active standby mode, system software and/or OS software is running. Thus, in examples, when transitioning from the active standby mode to the fully active mode, such software need not be initialized again, and this is one reason for the relatively short amount of time needed to transition to the active mode.

The fully active mode has the highest power consumption (e.g., on the order of 6-10 watts, in an example). In the active standby mode, the STB is actively being used to receive and process signals (e.g., from a signal source such as antenna, cable, satellite, etc.) and provide the processed signals to a display. In this mode, all software (e.g., system software, OS software, etc.) and audio/video systems necessary to achieve this are operating.

Figure 4:
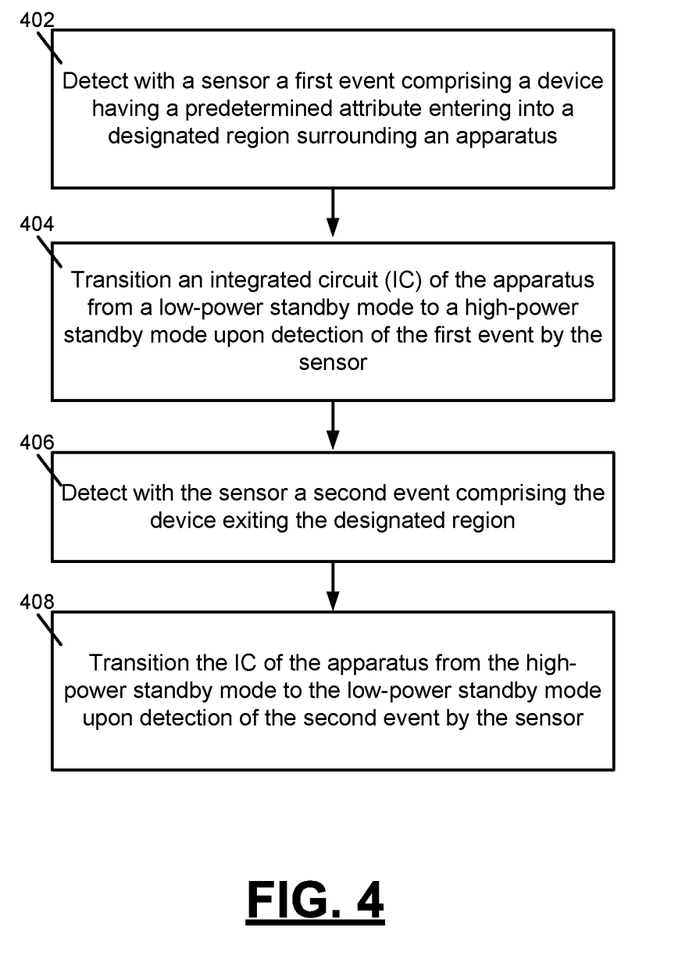
FIG. 4 is a flowchart illustrating an example method for conserving power in a device.

FIG. 4 is a flowchart illustrating an example method for conserving power in an apparatus, according to one embodiment. For example, the method illustrated in FIG. 4 can be performed by the STB 105. The illustrated method can be implemented in software, firmware, hardware, or any combination thereof. At 402, a sensor (e.g., sensor 122) detects a first event comprising a device (e.g., device 128) having a predetermined attribute entering into a designated region (e.g., designated region 202) surrounding the apparatus (e.g., STB 105). At 404, an integrated circuit (IC) (e.g., STB 105) of the apparatus transitions from a low-power standby mode to a high-power standby mode upon detection of the first event by the sensor. The IC consumes a higher amount of power in the high-power standby mode as compared to the low-power standby mode. At 406, the sensor detects a second event comprising the device exiting the designated region. At 408, the IC of the apparatus transitions from the high-power standby mode to the low-power standby mode upon detection of the second event by the sensor. The IC is further configured to transition from either the low-power standby mode or the high-power standby mode to an active mode upon occurrence of one of multiple wakeup events, where the transition from the high-power standby mode to the active mode takes less time than the transition from the low-power standby mode to the active mode. The device is configured to generate a wakeup event, for example, using mechanisms similar to those described above with respect to device 128.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. An apparatus comprising:
    a sensor configured to detect an event comprising a device having a predetermined attribute entering into a designated region surrounding the apparatus; and
    an integrated circuit (IC), wherein the IC is a system-on-chip (SOC) comprising a central processing unit (CPU), video processor, and memory, and wherein the IC is operable in multiple power modes and configured to
        transition from a low-power standby mode to a high-power standby mode upon detection of the event by the sensor, the IC consuming a higher amount of power in the high-power standby mode as compared to the low-power standby mode, wherein the SOC monitors for occurrence of a wakeup event and does not execute system software and operating system (OS) software when operating in the low-power standby mode, and wherein the SOC monitors for the wakeup event and executes the system software and OS software when operating in the high-power standby mode, and
        transition from either the low-power standby mode or the high-power standby mode to an active mode upon occurrence of the wakeup event, the transition from the high-power standby mode to the active mode taking less time than the transition from the low-power standby mode to the active mode.

2. The apparatus of claim 1, wherein the sensor is configured to detect a second event comprising the device exiting the designated region, and wherein the IC is configured to transition from the high-power standby mode to the low-power standby mode upon detection of the second event by the sensor.

3. The apparatus of claim 1, wherein the predetermined attribute is an ability of the device to generate and transmit a message formatted in accordance with a protocol that facilitates wireless streaming of audio and video data to the apparatus, a receipt of the message at the apparatus comprising the wakeup event.

4. The apparatus of claim 1, wherein the predetermined attribute is an ability of the device to generate a wireless signal that is detectable by the sensor.

5. The apparatus of claim 4, wherein the wireless signal is a Bluetooth Low Energy (BLE) signal.

6. A set-top box (STB) comprising:
    a sensor configured to detect an event comprising a device having a predetermined attribute entering into a designated region surrounding the apparatus; and
    a system-on-chip (SOC), wherein the SOC comprises a central processing unit (CPU), video processor, and memory, and wherein the SOC is operable in multiple power modes and configured to
        transition from a low-power standby mode to a high-power standby mode upon detection of the event by the sensor, the SOC consuming a higher amount of power in the high-power standby mode as compared to the low-power standby mode, wherein the SOC monitors for occurrence of a wakeup event and does not execute system software and operating system (OS) software when operating in the low-power standby mode, and wherein the SOC monitors for the wakeup event and executes the system software and OS software when operating in the high-power standby mode, and
        transition from either the low-power standby mode or the high-power standby mode to an active mode upon occurrence of the wakeup event, the transition from the high-power standby mode to the active mode taking less time than the transition from the low-power standby mode to the active mode.

7. The STB of claim 6, wherein the sensor is configured to detect a second event comprising the device exiting the designated region, and wherein the SOC is configured to transition from the high-power standby mode to the low-power standby mode upon detection of the second event by the sensor.

8. The STB of claim 6, wherein the predetermined attribute is an ability of the device to generate and transmit a message formatted in accordance with a protocol that facilitates wireless streaming of audio and video data to the STB, a receipt of the message at the STB comprising the wakeup event.

9. The STB of claim 6, wherein the predetermined attribute is an ability of the device to generate a wireless signal that is detectable by the sensor.

10. The STB of claim 9, wherein the wireless signal is a Bluetooth Low Energy (BLE) signal.

11. A method for conserving power in an apparatus, the method comprising:
    detecting, with a sensor, a first event comprising a device having a predetermined attribute entering into a designated region surrounding the apparatus;
    transitioning an integrated circuit (IC) of the apparatus from a low-power standby mode to a high-power standby mode upon detection of the first event by the sensor, the SOC comprising a central processing unit (CPU), video processor, and memory, and the IC consuming a higher amount of power in the high-power standby mode as compared to the low-power standby mode;

detecting with the sensor a second event comprising the device exiting the designated region; and transitioning the IC of the apparatus from the high-power standby mode to the low-power standby mode upon detection of the second event by the sensor, wherein the SOC monitors for occurrence of a wakeup event and does not execute system software and operating system (OS) software when operating in the low-power standby mode, and wherein the SOC monitors for the wakeup event and executes the system software and OS software when operating in the high-power standby mode, and wherein the IC is further configured to transition from either the low-power standby mode or the high-power standby mode to an active mode upon occurrence of the wakeup event, the transition from the high-power standby mode to the active mode taking less time than the transition from the low-power standby mode to the active mode.

12. The method of claim 11, wherein the predetermined attribute is an ability of the device to generate and transmit a message formatted in accordance with a protocol that facilitates wireless streaming of audio and video data to the apparatus, a receipt of the message at the apparatus comprising the wakeup event.

13. The method of claim 11, wherein the predetermined attribute is an ability of the device to generate a wireless signal that is detectable by the sensor.

14. The method of claim 13, wherein the wireless signal is a Bluetooth Low Energy (BLE) signal.

* * * * *